United States Patent

[11] 3,541,906

[72] Inventors George W. Sederberg,
Highland Heights, Kentucky;
James G. Wiatt, Cincinnati, Ohio
[21] Appl. No. 768,139
[22] Filed Oct. 16, 1968
[45] Patented Nov. 24, 1970
[73] Assignee Cincinnati Milacron Inc.
Cincinnati, Ohio
a corporation of Ohio

[54] METHOD AND SYSTEM FOR CONTROLLING SHARPENING AND REPLACEMENT OF A CUTTING BLADE OF A MATERIAL CUTTING MACHINE
13 Claims, 4 Drawing Figs.
[52] U.S. Cl..................................................... 83/13, 83/174
[51] Int. Cl..................................................... B26d 7/12

[50] Field of Search............................................ 83/13, 174
[56] References Cited
UNITED STATES PATENTS
3,286,569 11/1966 Hancock et al............... 83/174
3,292,470 12/1966 Nystrand et al............... 83/174

Primary Examiner—William S. Lawson
Attorney—Frank C. Leach, Jr.

ABSTRACT: The wear time of a cutting blade of a material cutting machine is timed by timing means. When a predetermined period of wear time has been timed by the timing means, means to sharpen the cutting blade are activated when the cutting blade is next removed from cutting engagement with the material. After a predetermined number of sharpenings of the cutting blade has occurred, indicating means warns the operator that the blade should be replaced.

Patented Nov. 24, 1970

INVENTORS

GEORGE W. SEDERBERG
JAMES G. WIATT

BY Frank C. Leach jr.

ATTORNEY

METHOD AND SYSTEM FOR CONTROLLING SHARPENING AND REPLACEMENT OF A CUTTING BLADE OF A MATERIAL CUTTING MACHINE

In the material cutting machine of the type shown and described in the copending patent application of George W. Sederberg for "Material Cutting Machine Having Reciprocating Cutting Blade Adapted To Enter Material Without An Entrance Cut," Ser. No. 726,657, filed May 6, 1968, and assigned to the same assignee as the assignee of the present application, there is shown a reciprocating cutting blade that automatically cuts the desired pattern in material. In order for the cutting blade to remain sharpened, it is necessary to sharpen the cutting blade before it becomes dull whereby it might damage the material or fail to make a clean cut.

One suitable means for sharpening the cutting blade of the aforesaid Sederberg application is the sharpening means shown and described in the copending patent application of Herman J. Baldwin for "Apparatus For Sharpening Reciprocating Cutting Blade Of Material Cutting Machine," Ser. No. 726,697, filed May 6, 1968, and assigned to the same assignee as the assignee of the present application. In the aforesaid Baldwin application, a numerical control apparatus controls when the cutting blade is sharpened by selecting various times when the blade is removed from cutting engagement with the material for sharpening.

The present invention utilizes a control system that eliminates the necessity to program into the numerical control apparatus when sharpening of the cutting blade is to occur. Thus, the control system of the present invention reduces the time required for programing each pattern into the numerical control apparatus since no time is required to program the time when the cutting blade is to be sharpened.

In the present invention, a control system is employed with the material cutting machine, when the material cutting machine is in its numerical control mode of operation, in which a time indicative of the wear of the cutting blade is utilized as the criteria as to when the cutting blade is to be sharpened. The control system of the present invention insures that sharpening of the cutting blade occurs only after a predetermined time period of reciprocation of the cutting blade has elapsed when the material cutting machine is in its numerical control mode of operation. Thus, while the numerical control apparatus must be programed for the times when the cutting blade is to be removed from the material to form the desired pattern in the material, there is no requirement for any type of programing of the time when the cutting blade is to be sharpened. Thus, the control system of the present invention may be readily utilized with any pattern that is to be cut by the material cutting machine without requiring special programing for when the cutting blade is to be sharpened.

During each sharpening of the cutting blade, the size of the cutting blade is reduced since some of the material of the cutting blade is ground away. Since all movements of the cutting blade are made in accordance with rotation of the cutting blade about an axis forward of its geometric axis, it is desirable that the cutting blade be replaced before the size of the cutting blade is reduced to such an extent that the leading edge of the cutting blade does not reach the axis of rotation of the cutting blade.

The present invention solves the foregoing problem by indicating to the operator when a cutting blade should be replaced; this is after a predetermined number of sharpenings. Of course, if the operator determines by inspection that the size of the cutting blade has not been reduced to an undesired extent, the operator may continue utilization of the cutting blade.

Furthermore, through warning the operator that the cutting blade has been sharpened a predetermined number of times, the possibility of any breakage of the cutting blade due to its becoming too thin is reduced. Therefore, if the operator replaces the cutting blade when the indicating means of the present invention indicates that the cutting blade should be replaced, the possibilities of damage to the material are reduced.

An object of this invention is to provide a method and device for controlling when sharpening of a cutting blade of a material cutting machine is to occur.

Another object of this invention is to provide a method and device for controlling when a cutting blade of a material cutting machine should be replaced.

Other objects of this invention will be readily perceived from the following description, claims, and drawings.

This invention relates to a system for controlling sharpening of a cutting blade of a material cutting machine including means to record time indicative of the wear of the cutting blade and means to cause the cutting blade to be removed from cutting engagement with the material being cut. The system has means to initiate sharpening of the cutting blade only when the causing means is activated after the recording means has recorded a predetermined period of time.

This invention also relates to a system for determining when a cutting blade of a material cutting machine is to be replaced. The system includes means to count each sharpening of the cutting blade and means to indicate when the cutting blade has been sharpened a predetermined number of times whereby the cutting blade is to be replaced.

This invention further relates to a method for controlling sharpening of a cutting blade of a material cutting machine. The method includes recording time indicative of the wear of the cutting blade and initiating sharpening of the cutting blade when the cutting blade is removed from cutting engagement with the material being cut after a predetermined period of time has been recorded.

The attached drawings illustrate a preferred embodiment of the invention, in which.

Figure 1:
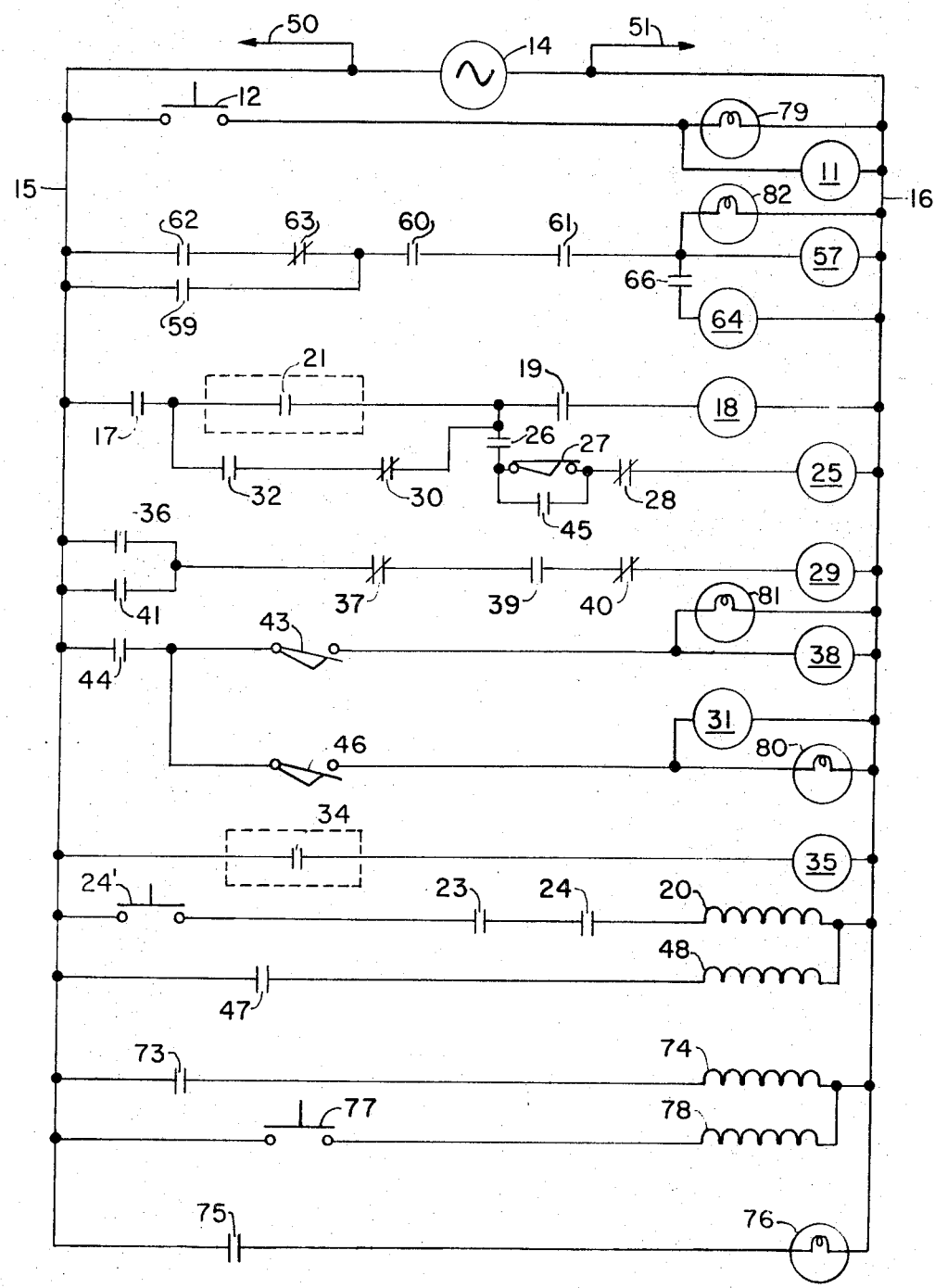
FIG. 1 is a schematic wiring diagram of the circuit of the present invention for determining when sharpening and replacement of a cutting blade is to occur.

Referring to the drawings and particularly FIG. 1, there is shown a circuit for controlling the sharpening of a cutting blade 10 (see FIG. 4) of a material cutting machine of the type more particularly shown and described in the aforesaid Sederberg application. The control system of the present invention includes a control relay 11, which is energized whenever a push button 12 is moved to a closed position to produce automatic sharpening of the cutting blade 10. The push button 12 also may be utilized for a manual sharpening cycle, which may be utilized for sharpening the cutting blade 10 but will not be described or shown herein.

When the push button 12 is moved to a closed position, the relay 11 is energized from an a.c. source 14 through leads 15 and 16. Upon picking or energizing of the control relay 11, its normally open contacts 17, which are disposed in series with a control relay 18, are closed.

Figure 3:
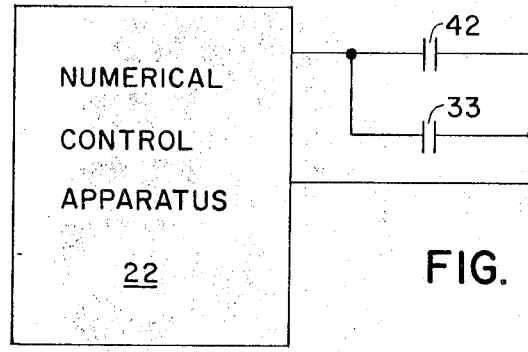
FIG. 3 is a schematic wiring diagram of another portion of the circuit of the present invention.

The control relay 18, which initiates the sharpening cycle, cannot be energized until normally open contacts 19 of a timer 20 and normally open contacts 21 of a relay (not shown), which is controlled by a numerical control apparatus 22 (see FIG. 3), are closed. The timer 20 is utilized to record the time during which the cutting blade 10 of the material cutting machine is reciprocating when the material cutting machine is in its numerical control mode of operation.

The timer 20 is energized when normally open contacts 23 of the relay 11, normally open contacts 24, and a push button 24' are closed. The normally open contacts 24 are closed whenever the motor, which reciprocates the cutting blade 10, is energized. Thus, the contacts 24 are closed when starting of the cutting operation is to occur since the blade must be reciprocating to cut the material. The contacts 23 are closed only when the push button 12 has been moved to a closed position to energize the relay 11 while the push button 24' is closed when the material cutting machine is in its numerical control mode of operation. Thus, when utilizing the automatic sharpening cycle of the present invention, the timer 20 records only when the cutting blade 10 is reciprocating with the material cutting machine in its numerical control mode of operation and automatic sharpening is desired.

Accordingly, when the timer 20 has recorded a predetermined time period of reciprocation of the cutting blade 10 through being energized for this predetermined period of time, its normally open contacts 19 close. However, the control relay 18 will still not be energized to start the sharpening cycle since the normally open contacts 21 close only when the cutting blade 10 is to be removed from engagement with the material being cut in accordance with the pattern programmed in the numerical control apparatus 22.

Thus, after the cutting blade 10 has been engaged with the material being cut for the predetermined period of reciprocation, sharpening of the cutting blade 10 does not occur until the next time that the cutting blade 10 is removed from cutting engagement with the material to cause the cutting blade 10 to pierce the material at another position with the same or a different heading or at the same position with a different heading. However, when this occurs, the normally open contacts 21 close for a short period of time whereby the relay 18 is picked.

It should be understood that the contacts 21 close every time that the cutting blade 10 is removed from engagement with the material being cut. However, energization of the relay 18 is possible only when the timer 20 has closed its contacts 19. Thus, no time is lost in sharpening the cutting blade 10 since it occurs only when the cutting blade 10 is removed from engagement with the material.

During each closing of the normally open contacts 21 when the normally open contacts 19 are not closed, a control relay 25, which causes the cutting blade 10 to be removed from cutting engagement with the material when it is energized, is picked through normally open contacts 26 of the relay 11 being closed, a closed limit switch 27, and normally closed contacts 28 of a relay 29, which causes return of the cutting blade 10 into engagement with the material being cut when it is energized. Since the contacts 21 remain closed for only a short period of time, a hold circuit for the relay 25 is provided around the contacts 21 through normally closed contacts 30 of a relay 31 and normally open contacts 32 of the relay 25. The relay 31 is energized only when the cutting blade 10 is removed from the material a greater distance for sharpening than during removal of the cutting blade 10 from the material when sharpening is not to occur.

Accordingly, whenever the relay 25 is energized through closing of the contacts 21, a hold circuit for the relay 25 is provided through the contacts 30 and 32 to maintain the relay 25 energized until the cutting blade 10 has been removed sufficiently from the material to a position for changing the relation between the cutting blade 10 and the material by creating relative horizontal movement between the cutting blade 10 and the material or changing the heading of the blade 10 with respect to the material at the same position. When this position has been reached, the limit switch 27 is opened to deenergize the relay 25.

When the relay 25 is energized, its normally open contacts 33 (see FIG. 3) close to supply a signal to the numerical control apparatus 22 to prevent any rotation of the cutting blade 10 about its axis, any transverse movement of the cutting blade 10, or any longitudinal movement of the material. Thus, when the normally open contacts 33 of the relay 25 close, this inhibits any output signals from the numerical control apparatus 22.

When the limit switch 27 is opened due to the cutting blade 10 being moved to the desired position in which relative movement between the cutting blade 10 and the material may occur, the normally open contacts 33 open since the relay 25 is deenergized by the limit switch 27 opening so that the numerical control apparatus 22 may supply output signals to cause the desired relative movements between the material and the cutting blade 10. After these various movements have been completed, the numerical control apparatus 22 causes closing of normally open contacts 34 of a relay (not shown) of the numerical control apparatus 22.

When the contacts 34 close, a control relay 35 is picked to cause energization of the relay 29. This is due to normally open contacts 36 of the relay 35 closing when the relay 35 is energized. As a result, a circuit is completed from the lead 15 to the lead 16 through the normally open contacts 36, normally closed contacts 37 of a relay 38 which is energized only when the cutting blade 10 is in cutting engagement with the material being cut, normally open contacts 39 of the relay 11, and normally closed contacts 40 of the relay 25.

Since the relay 11 is energized as it is desired to have automatic sharpening and the relay 25 is deenergized due to the limit switch 27 opening, the control relay 29 is picked. This results in the cutting blade 10 being returned into cutting engagement with the material.

Since the relay 35 is energized for only a very short period of time as the output from the numerical control apparatus 22 is stopped in a very short period of time, the contacts 36 of the relay 35 are bypassed by normally open contacts 41 of the relay 29 to form a hold circuit therefor. Accordingly, even though the relay 35 is energized only for a very short period of time, this is sufficient to cause the relay 29 to be energized and to remain energized through the contacts 41 of the relay 29.

When the relay 29 is energized, its normally open contacts 42 close to supply a signal to the numerical control apparatus 22. This inhibits any further output from the numerical control apparatus 22 to produce any relative movement between the cutting blade and the material other than the return of the cutting blade 10 into cutting engagement with the material that is being produced due to the energization of the relay 29.

During the return of the cutting blade 10 into cutting engagement with the material, the normally closed contacts 28 of the relay 29 are opened since the relay 29 is energized. As a result, there is no way in which the relay 25 can be energized to cause any movement of the cutting blade 10 away from the material being cut. Thus, this is a safety feature.

When the cutting blade 10 has been returned into cutting engagement with the material and is in the desired position, a limit switch 43 is closed to cause energization of the relay 38 since normally open contacts 44, which are in series with the relay 38 and the switch 43, are closed when the motor, which causes reciprocation of the cutting blade 10, is energized. Accordingly, picking of the relay 38 results in opening of the normally closed contacts 37 whereby the relay 29 is deenergized. When this occurs, the normally open contacts 42 of the relay 29 open to allow the numerical control apparatus 22 to supply signals to cause relative horizontal movement between the cutting blade 10 and the material to produce further cutting of the material to form the desired pattern therein.

When the relay 29 is deenergized, its normally closed contacts 28 again close. This permits the relay 25 to be ready to be energized whenever the normally open contacts 21 are again closed.

As previously mentioned, the relay 18 is picked only when both the contacts 19 and the contacts 21 are closed along with the contacts 17. When this occurs, the control relay 25 is again energized in the same manner as if sharpening was not required. However, since the relay 18 has been picked, its normally open contacts 45, which are disposed in parallel with the limit switch 27, are closed. As a result, the limit switch 27, which normally limits the amount of movement of the cutting blade 10 away from the material, is rendered ineffective when sharpening is to occur. Thus, additional movement of the cutting blade 10 away from the material occurs when the relay 18 is energized since its normally open contacts 45 are closed to maintain the relay 25 energized for a longer period of time.

The relay 25 remains energized until the relay is energized due to a limit switch 46 closing. The limit switch 4 6 closes when the cutting blade 10 has moved away from the material the desired maximum extent to allow sharpening of the entire length of the cutting blade 10 on one side thereof as more specifically described in the aforesaid Baldwin application. When the relay 31 is energized, its normally closed contacts 30 in the hold circuit for the relays 18 and 25 open to deenergize the relays 18 and 25.

As previously described when the cutting blade 10 was being removed from the material for merely changing the position of the cutting blade 10, the normally open contacts 33 (see FIG. 3) of the relay 25 are closed as long as the relay 25 is picked to inhibit any output from the numerical control apparatus 22 to cause any relative horizontal movement between the cutting blade 10 and the material being cut or any rotation of the cutting blade 10. However, as soon as the relay 25 is deenergized due to picking of the relay 31, the numerical control apparatus 22 may supply signals to position the cutting blade 10 in the desired position with respect to the material.

When the relay 18 is deenergized simultaneously with the relay 25, it causes the timer 20 to be returned to the position in which it will again start recording the reciprocation time of the cutting blade 10. This is because normally open contacts 47 of the relay 31 close when the relay 31 is picked. As a result, a coil 48 of a timer clutch is energized to return the timer 20 to its start position. Therefore, whenever the next closing of the contacts 21 occurs, the contacts 19 would be open so that the relay 18 cannot again be picked until the predetermined time period of reciprocation by the cutting blade 10 has again elapsed.

When all of the programed moves of the cutting blade 10 and the material have been completed to permit the next portion of the desired pattern to be formed in the material, the cutting blade 10 is ready to be returned into cutting engagement with the material. When this is to occur, the relay 35 is picked through closing of the normally open contacts 34 by a signal from the numerical control apparatus 22. When the relay 35 is energized, its normally open contacts 36 close to cause energization of the relay 29 as previously described when the cutting blade 10 was merely removed from the material without sharpening occurring.

Upon energization of the relay 29 to cause return of the cutting blade 10 into cutting engagement with the material, the limit switch 46 opens to deenergize the relay 31 as soon as return movement of the cutting blade 10 begins. This causes the normally closed contacts 30 of the relay 31 to close. However, since the relay 25 is deenergized there is no energization of the relay 25 since the normally open contacts 32 of the relay 25 are open.

When the relay 29 is energized, the cutting blade 10 is returned into engagement with the material. When the cutting blade 10 has been returned to the desired position in which it is in cutting engagement with the material, the limit switch 43 is closed to cause energization of the relay 38 whereby the normally closed contacts 37 of the relay 38 open to deenergize the relay 29. As a result, further return of the cutting blade 10 into the material ceases. This also stops sharpening of the opposite side of the cutting blade 10 from that sharpened during removal of the cutting blade 10 from the material.

During energization of the relay 29, the normally open contacts 42 (see FIG. 3) of the relay 29 are closed to inhibit any output signals from the numerical control apparatus 22 to cause any relative horizontal movement between the cutting blade 10 and the material being cut or any rotation of the cutting blade 10. This prevents any inadvertent movement of the cutting blade 10 from the desired position at which cutting is to occur.

Figure 2:
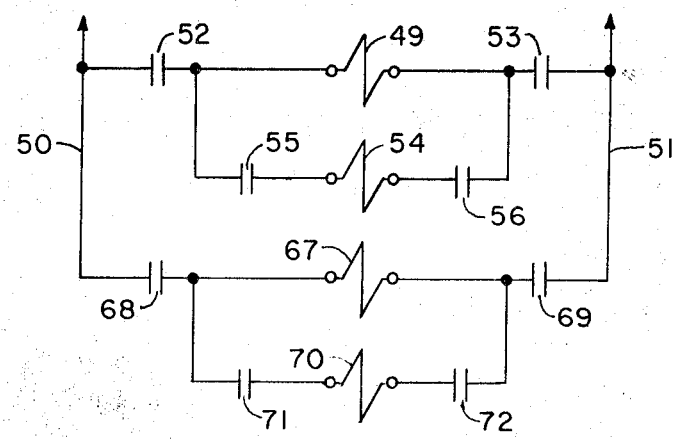
FIG. 2 is a schematic wiring diagram of the circuits for controlling the various solenoids of the material cutting machine with which the present invention is utilized.

As previously mentioned, the energization of the relay 25 causes the cutting blade 10 to be removed from cutting engagement with the material. This is accomplished through energizing a solenoid 49 (see FIG. 2) by leads 50 and 51 from the a.c. source 14. The solenoid 49 is energized when normally open contacts 52 and 53 of the relay 25 are closed due to the relay 25 being picked.

The energization of the solenoid 49 controls the supply of hydraulic fluid to a hydraulic cylinder that controls movement of the cutting blade 10 out of and into cutting engagement with the material in the manner more specifically shown and described in the aforesaid Sederberg application. Thus, when the solenoid 49 is energized, fluid is supplied to the hydraulic cylinder to cause removal of the cutting blade 10 from the material being cut.

A solenoid 54 has its coil connected in parallel with the coil of the solenoid 49 and is energized only when normally open contacts 55 and 56 of a relay 57 are closed along with the normally open contacts 52 and 53 of the relay 25 being closed. When the solenoid 54 is energized, it causes a grinding wheel 58 (see FIG. 4) to be moved into engagement with one side of the cutting blade 10 to sharpen the cutting blade in the manner more particularly shown and described in the aforesaid Baldwin application.

The solenoid 54 can only be energized when the solenoid 49 is energized to remove the cutting blade 10 from the material being cut and the normally open contacts 55 and 56 of the relay 57 are closed. This occurs only when normally open contacts 59 of the relay 18 are closed. Since the relay 18 is energized only when sharpening of the cutting blade 10 is desired, the solenoid 54 is energized only when sharpening of the cutting blade 10 is to occur in accordance with the predetermined time period of reciprocation as determined by the timer 20.

The circuit of the relay 57 also includes normally open contacts 60 and normally open contacts 61. The normally open contacts 60 are closed whenever the motor, which reciprocates the cutting blade 10, is energized. Thus, the contacts 60 are closed when starting of the cutting operation is to occur since the blade 10 must be reciprocating to cut the material. The normally open contacts 61 are closed whenever it is desired to start operation of the material cutting machine; this closing of the normally open contacts 61 indicates that hydraulic fluid pressure is being supplied to the various hydraulic controls that create the relative horizontal movement between the cutting blade 10 and the material being cut and the rotation of the cutting blade 10.

When the relay 57 is picked, normally open contacts 62 of the relay 57 are closed. The normally open contacts 62 are disposed in series with normally closed contacts 63 of the relay 38, which is deenergized as soon as the cutting blade 10 starts to be removed from the material. Since the contacts 62 and 63 are disposed in a circuit parallel to the normally open contacts 59 of the relay 18, a hold circuit is provided for the relay 57 after the relay 18 is deenergized due to the cutting blade 10 reaching its maximum removal position from the material to which it is moved for sharpening purposes.

Figure 4:
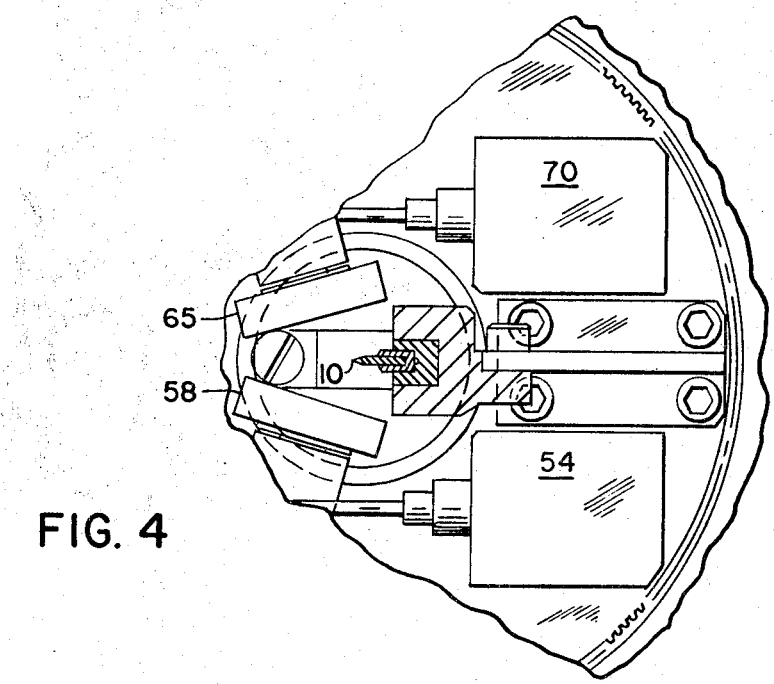
FIG. 4 is a fragmentary sectional view of a portion of a material cutting machine utilizing the present invention.

Additionally, energization of the relay 57 also causes energization of a motor 64, which rotates the grinding wheel 58 and a grinding wheel 65. As shown in FIG. 4, the grinding wheel 65 is disposed on the opposite side of the cutting blade 10 from the grinding wheel 58.

The motor 64 is energized due to normally open contacts 66 of the relay 57 closing when the relay 57 is picked. Thus, the motor 64 cannot be started until the relay 57 is energized. However, the grinding wheels 58 and 65 will be rotating when the grinding wheel 58 is moved into engagement with the cutting blade 10 by the solenoid 54 since energization of the motor 64 occurs simultaneously with movement of the grinding wheel 58 toward the cutting blade 10.

While the normally open contacts 55 and 56 remain closed even after the cutting blade 10 reaches its maximum removal position from the material and movements of the cutting blade 10 and the material may occur through the numerical control apparatus 22, the solenoid 54 is deenergized as soon as the relay 25 is deenergized because the contacts 52 and 53 of the relay 25 open. This prevents any power being supplied from the leads 50 and 51 to the solenoid 54. As a result, upon the relay 31 being picked by closing of the limit switch 46, the solenoid 54 is deenergized to remove the grinding wheel 58 from engagement with the cutting blade 10 to cease sharpening of the adjacent side thereof.

As previously mentioned, energization of the relay 29 causes return of the cutting blade 10 into cutting engagement with the material. This is accomplished by energizing a solenoid 67 through normally open contacts 68 and 69 of the relay 29. When the contacts 68 and 69 are closed, power is supplied from the a.c. source 14 through the leads 50 and 51 to cause energization of the solenoid 67. As a result, fluid is supplied to the hydraulic cylinder, which controls the raising and lowering of the cutting blade 10 in the manner more specifically shown and described in the aforesaid Sederberg application, to return the cutting blade 10 into cutting engagement with the material being cut.

When the sharpening cycle is occuring, the energization of the relay 29 also causes energization of a solenoid 70, which controls the movement of the grinding wheel 65. When the solenoid 70 is energized, the grinding wheel 65 is moved into engagement with the adjacent side of the cutting blade 10 to sharpen the cutting blade 10 as it returns into cutting engagement with the material. The coil of the solenoid 70 is connected in parallel with the coil of the solenoid 67 through normally open contacts 71 and 72 of the relay 57.

While the normally open contacts 71 and 72 of the relay 57 are closed as soon as the relay 57 is energized, the coil of the solenoid 70 cannot be energized until the normally open contacts 68 and 69 of the relay 29 are energized. This can occur only when the cutting blade 10 is returned into cutting engagement with the material. As a result, this arrangement insures that the grinding wheel 65 engages the adjacent surface of the cutting blade 10 only during return of the cutting blade 10 into cutting engagement with the material being cut.

Thus, the foregoing arrangement results in sharpening of one side of the cutting blade 10 by the grinding wheel 58 during its movement away from the material and sharpening of the other side of the cutting blade 10 by the grinding wheel 65 during movement into the material.

When the cutting blade 10 has been completely returned into cutting engagement with the material through energization of the relay 29, the limit switch 43 is closed. This results in the relay 38 being picked whereby the relay 29 is deenergized since the normally closed contacts 37 of the relay 38 open. As a result of the normally closed contacts 63 of the relay 38 also opening due to energization of the relay 38, the relay 57 is deenergized. This results in stopping of the grinding wheel motor 64 through opening the contacts 66 and disconnecting the solenoids 54 and 70 through opening the contacts 55, 56 and 71, 72, respectively.

No further sharpening of the cutting blade 10 will occur until the timer 20 has again recorded the predetermined time period of reciprocation of the cutting blade 10. When this time has elapsed, another cycle begins when the normally open contacts 21 are closed by the numerical control apparatus 22.

As shown in FIG. 1, each energization of the relay 57 results in closing of normally open contacts 73, which are in series with a coil 74 of a counter. Since the relay 57 is picked only when sharpening of the cutting blade 10 is to occur, the coil 74 of the counter is energized only when sharpening of the cutting blade 10 occurs. Accordingly, the counter counts each time that the coil 74 is energized so that the counter counts the number of sharpenings of the cutting blade 10.

When a predetermined number of sharpenings of the cutting blade 10 has occurred so that the cutting blade normally will be sufficiently worn to require replacement, normally open contacts 75 of a relay (not shown), which is controlled by the counter, are closed. This results in a light 76, which is disposed in series with the normally open contacts 75, being energized. The light 76 warns the operator of the cutting machine that the cutting blade 10 should be replaced. Instead of utilizing the light 76 as the warning device, any other suitable warning means such as an audio means could be employed if desired.

After the light 76 is energized, the operator manually actuates a push button 77 to close a circuit through a coil 78 of a clutch for the counter. When the coil 78 of the clutch is energized, the counter is returned to zero so that counting again begins when the normally open contacts 73 of the relay 57 are next closed.

Since the counting of the number of the sharpenings of the cutting blade 10 only energizes the light 76 and does not stop operation of the cutting machine, the operator may continue operation of the cutting machine as long as desired. This would depend upon inspection of the cutting blade 10. While further energizations of the normally open contacts 73 would energize the coil 74 of the counter, this additional counting will not affect the light 76 since it is already energized.

Therefore, until the operator of the cutting machine replaces the cutting blade 10, the push button 77 is not moved to its closed position. However, upon replacing the cutting blade 10, the push button 77 is moved to a closed position to energize the coil 78 of the clutch whereby the clutch is activated to return the counter to its start or zero position.

Considering the operation of the present invention for an automatic sharpening cycle, the timer 20 records the time that the cutting blade 10 reciprocates. When the predetermined period of reciprocation has been completed, the normally open contacts 19 of the timer 20 close. However, no sharpening of the cutting blade 10 occurs until the numerical control apparatus 22 next indicates that the cutting blade 10 is to be removed from cutting engagement with the material being cut. When this occurs, the normally open contacts 21 close to cause energization of the relay 18 since the contacts 19 are closed.

The energization of the relay 18 causes picking of the relay 57 through closing the normally open contacts 59 of the relay 18 whereby the grinding wheel motor 64 is energized to cause rotation of the grinding wheels 58 and 65. Furthermore, both of the solenoids 54 and 70, which control movement of the grinding wheels 58 and 65, respectively, into the adjacent sides of the cutting blade 10 for sharpening, are connected through the circuits for the solenoids 49 and 67, respectively.

Accordingly, since the closing of the contacts 21 not only picks the relay 18 but also energizes the relay 25, the solenoids 49 and 54 are energized. This causes the cutting blade 10 to be removed from the material and the grinding wheel 58 to be moved into engagement with the adjacent side of the cutting blade 10.

When movement of the cutting blade 10 away from the material for sharpening purposes is completed as indicated by the limit switch 46 closing, the relays 18 and 25 are deenergized due to the relay 31 being energized. This not only stops the movement of the cutting blade 10 away from the material but also retracts the grinding wheel 58 from engagement with the adjacent surface of the cutting blade 10.

When the relay 31 is picked by closing of the limit switch 46, the clutch 48 is energized due to closing of the normally open contacts 47 of the relay 31. As a result, the timer 20 is returned to its start position to again start recording the time that the cutting blade 10 reciprocates.

After the numerical control apparatus 22 completes any desired movements in a horizontal plane between the cutting blade 10 and the material through moving the cutting blade 10 transversely to the material or moving the material longitudinally relative to the cutting blade 10 and any desired rotation of the cutting blade 10 in the manner more particularly shown and described in the aforesaid Sederberg application, the numerical control apparatus 22 causes picking of the relay 29 through picking the relay 35 by closing the normally open contacts 34. When the relay 29 is picked, the solenoids 67 and 70 are energized. As a result, return of the cutting blade 10 into cutting engagement with the material starts, and the grinding wheel 65 is moved into engagement with the adjacent side of the cutting blade 10 to sharpen the opposite side of the cutting blade 10 from that sharpened by the grinding wheel 58 during movement of the cutting blade 10 away from the material.

When the cutting blade 10 completes its return into the material, the limit switch 43 is closed to energize the relay 38. This results in opening of the normally closed contacts 37 of the relay 38 whereby the relay 29 is deenergized.

The deenergization of the relay 29 opens the contacts 68 and 69 to deenergize the solenoids 67 and 70. This not only stops movement of the cutting blade 10 but also results in the solenoid 70 being deenergized to remove the grinding wheel 65 from engagement with the cutting blade 10.

Furthermore, the energization of the relay 38 also deenergizes the relay 57 since the normally closed contacts 63 of the relay 38 in the hold circuit are open. As a result of the deenergization of the relay 57, the grinding wheel motor 64 is deenergized to stop rotation of the grinding wheels 58 and 65. The deenergization of the relay 57 also results in the solenoids 54 and 70 being disconnected from the circuits for the solenoids 49 and 67, respectively. As a result, the grinding wheels 58 and 65 cannot be moved into engagement with the cutting blade 10 to cause sharpening thereof until the relay 18 is next energized due to closing of the normally open contacts 19 of the timer 20. This can occur only after the cutting blade 10 has again reciprocated for the predetermined period of time.

During each energization of the relay 57, the normally open contacts 73 of the relay 57 close to energize the coil 74 of the counter. Thus, the counter counts each time that the cutting blade 10 is sharpened.

After a predetermined number of sharpening of the cutting blade 10 has occurred, the counter causes closing of the normally open contacts 75. When this occurs, the light 76 is energized to warn the operator that the cutting blade 10 should be replaced since a predetermined number of sharpenings of the cutting blade 10 has occurred.

If the operator elects to replace the cutting blade 10 at this time, the cutting blade 10 is replaced. Then, the push button 77 is manually moved to its closed position to energize the coil 78 of the clutch to return the counter to its zero or start position.

Of course, the operator can inspect the cutting blade 10 and decide that it may be utilized for a longer period of time. When this occurs, the push button 77 is not moved to its closed position until the cutting blade 10 is replaced.

It should be understood that lamps are utilized to indicate to the operator when the relays 11, 31, 38, and 57 are energized. Thus, when the relay 11 is picked for automatic sharpening, a lamp 79, which is in parallel with the relay 11, is energized.

When the relay 31 is picked (This occurs only during sharpening), a lamp 80, which is in parallel with the relay 31, is energized. This indicates that sharpening of one side of the cutting blade 10 has been completed since the relay 31 is energized only at the completion of sharpening of one side of the cutting blade 10.

When the relay 38 is energized, a lamp 81, which is in parallel with the relay 38, lights. This indicates to the operator that the cutting blade 10 is in cutting engagement with the material being cut.

When the relay 57 is picked to cause sharpening of the cutting blade 10, a lamp 82, which is in parallel with the relay 57, is energized. This indicates that the grinding wheel motor 64 is energized and that the contacts 55, 56, 71, and 72 are closed.

While the present invention has been described with respect to recording the time that the cutting blade 10 reciprocates, it should be understood that other times indicative of the wear of the cutting blade 10 could be timed. For example, instead of utilizing the contacts 24 to energize the timer 20 whenever the cutting blade 10 reciprocates, the normally open contacts 24 could be replaced by other contacts whereby the timer 20 could record the time that the cutting blade 10 is in cutting engagement with the material.

Thus, the timer 20 would be actuated until removal of the cutting blade 10 from the material is completed as indicated by the relay 25 being deenergized Then, the timer 20 could be activated again when the cutting blade 10 begins to return into cutting engagement with the material due to the relay 29 being picked. The timer 20 would have to remain activated when the cutting blade 10 has completed return to its cutting position as indicated by energization of the relay 38. Therefore, this arrangement would necessitate using normally open contacts of the relays 25, 29, and 38 in parallel in place of the normally open contacts 24.

While the cutting blade 10 of the aforesaid Sederberg application is a reciprocating cutting blade, it should be understood that the present invention may be utilized for sharpening cutting blades that are not reciprocating. It would be necessary to determine a time indicative of wear of the cutting blade in some other manner other than by timing the time of reciprocation of the cutting blade since the cutting blade does not reciprocate.

While the present invention has shown the coil 78 of the clutch for the counter being activated only by the manual push button 77, it should be understood that the coil 78 could be activated automatically whenever the light 76 was energized through utilizing a second set of normally open contacts, which are controlled by the counter, in place of the manual push button 77. Of course, this would eliminate the operator being able to continue utilizing the cutting blade 10 after the light 76 is energized.

An advantage of this invention is that the blade does not become dull so that no damage to the material may occur due to it being cut improperly by a dull cutting blade. Another advantage of this invention is that it automatically indicates when a cutting blade should be replaced. A further advantage of this invention is that it reduces the possibility of blade breakage.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

We claim:

1. A system for controlling sharpening of a cutting blade of a material cutting machine including:
   means to record time indicative of the wear of the cutting blade;
   means to cause the cutting blade to be removed from cutting engagement with the material being cut; and
   means to initiate sharpening of the cutting blade only when said causing means is activated after said recording means has recorded a predetermined period of time.

2. The system according to claim 1 including:
   first means responsive to said recording means when said recording means has recorded a predetermined period of time;
   second means responsive to removal of the cutting blade from cutting engagement with the material being cut; and
   said initiating means including means activated only when said first and second responsive means are activated.

3. The system according to claim 1 including means to indicate when the cutting blade has been sharpened a predetermined number of times.

4. The system according to claim 3 in which said indicating means includes means to count each sharpening of the cutting blade.

5. The system according to claim 4 including means to remove all of the counted sharpenings of the cutting blade from said counting means of said indicating means.

6. The system according to claim 5 in which said removal means is manually actuated.

7. The system according to claim 1 including means to remove all the predetermined period of time from said recording means after said initiating means is activated.

8. The system according to claim 7 in which said removal means is automatically activated during sharpening of the cutting blade.

9. A system for determining when a cutting blade of a material cutting machine is to be replaced including:
   means to count each sharpening of the cutting blade; and means to indicate when the cutting blade has been sharpened a predetermined number of times whereby the cutting blade is to be replaced.

10. The system according to claim 9 including means to remove all of the counted sharpenings of the cutting blade from said counting means.

11. The system according to claim 10 in which said removal means is manually actuated.

12. A method for controlling sharpening of a reciprocating cutting blade of a material cutting machine including:
recording time indicative of the wear of the reciprocating cutting blade;
interrupting the cutting operation of the reciprocating cutting blade cutting the material by being in cutting engagement therewith through removal of the cutting blade from cutting engagement with the material after a predetermined period of time has been recorded; and
initiating sharpening of the cutting blade when the cutting blade is removed from cutting engagement with the material being cut after the predetermined period of time has been recorded.

13. The method according to claim 12 including:
counting each time that the cutting blade is sharpened; and
indicating when the blade has been sharpened a predetermined number of times.

UNITED STATES PATENT OFFICE
CERTIFICATE OF CORRECTION

Patent No. 3,541,906         Dated November 24, 1970

Inventor(s) George W. Sederberg et al.

It is certified that error appears in the above-identified patent and that said Letters Patent are hereby corrected as shown below:

Column 1, lines 31 and 47, and 50 and 51, "programing", each occurrence, should read -- programming --. same column 1 line 44, and Column 3, line 16, "programed", each occurren should read -- programmed --; Column 4, line 74, after "rela second occurrence, insert -- 31 --. Column 9, line 48, after "pening" insert a period.

Signed and sealed this 4th day of May 1971.

(SEAL)
Attest:

EDWARD M. FLETCHER, JR.         WILLIAM E. SCHUYLER, J
Attesting Officer               Commissioner of Patent